Dec. 24, 1940.   L. A. FRAYER ET AL   2,226,399
PRODUCTION OF CASTLE NUTS
Filed July 6, 1938   4 Sheets-Sheet 1

INVENTORS
LEE A. FRAYER
ROY S. SALTER
BY Kwis Hudson & Kent
ATTORNEYS

INVENTORS
LEE A. FRAYER
ROY S. SALTER
BY
Kwis Hudson & Kent
ATTORNEYS

INVENTORS
LEE A. FRAYER
ROY S. SALTER
BY
Kwis Hudson & Kent
ATTORNEYS

INVENTORS
LEE A. FRAYER
ROY S. SALTER
BY Kwin Hudson & Kent
ATTORNEYS

Patented Dec. 24, 1940

2,226,399

UNITED STATES PATENT OFFICE 2,226,399

PRODUCTION OF CASTLE NUTS

Lee A. Frayer and Roy S. Salter, Kent, Ohio, assignors to The Lamson & Sessions Company, Cleveland, Ohio, a corporation of Ohio Application July 6, 1938, Serial No. 217,799

3 Claims. (Cl. 10—76)

This invention relates to the production of pronged articles such as castle nuts and the like, and more particularly to a novel method and improved apparatus by which the production of such articles can be satisfactorily and economically carried out.

An object of our invention is to provide a novel method for the production of castle nuts and the like by which such articles can be rapidly and economically produced, and by which articles having more regular form and prongs of greater length than heretofore can be satisfactorily produced.

Another object of our invention is to provide a novel method of making castle nuts or the like in which a solid substantially cylindrical blank is upset to polygonal shape and prongs formed thereon in a single operation.

Another object of our invention is to provide a novel method of making castle nuts by cold working, comprising upsetting a blank and in the same operation pressure shaping the blank to polygonal form and extruding metal of the blank to form prongs thereon.

Yet another object of our invention is to provide a novel method of making castle nuts and the like in which the shaping of the blank and the forming of prongs thereon is carried out progressively in a series of successive operations and the blank is reversed end for end while being transferred from one station to the next succeeding station.

Still another object of our invention is to provide a novel method and improved apparatus for making castle nuts or the like in which a blank is pressure shaped in a die to form prongs thereon and is ejected from the die by knock-out thrust applied to the prongs.

A further object of our invention is to provide improved apparatus for the production of castle nuts and the like, including a piercing punch for forming a tap opening axially of the pronged article and which has a shouldered portion thereon for preventing inward bending of the prongs during the piercing.

Our invention may be further briefly summarized as consisting in certain novel steps of procedure, combinations and arrangements of parts hereinafter described and particularly set out in the appended claims.

In the accompanying sheets of drawings—

More detailed reference will now be made to the accompanying drawings in which we have illustrated our novel method of making pronged articles such as castle nuts and have shown improved apparatus with which the production of such articles can be economically carried out. Before proceeding with the detailed description, however, it should be understood that the invention is not necessarily limited to the particular steps of procedure and apparatus herein disclosed, but is intended to embrace all variations thereof coming within the scope of the appended claims.

Figure 6:
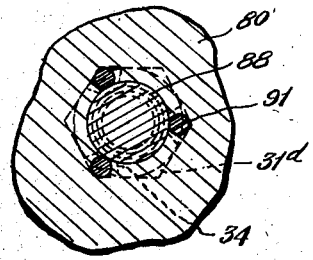
Fig. 6 is a similar partial transverse sectional view taken through the last forming die of the series as indicated by section line 6—6.
Figure 1:
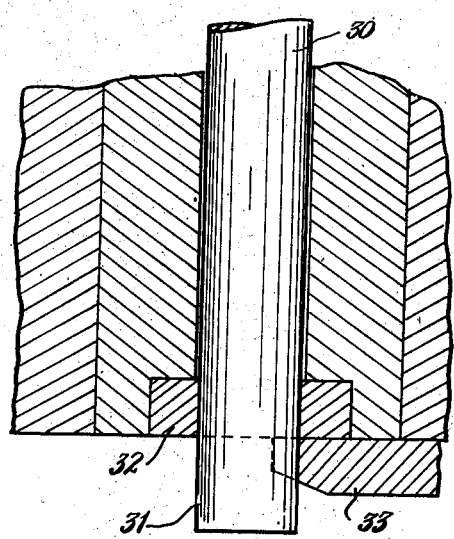
Fig. 1 is a sectional view taken through cooperating cut-off dies by which successive blanks or slugs are cut from bar or wire stock.
Figure 7:
Fig. 7 is an end or plan view of the blank or slug which is operated upon in our method.
Figure 8:
Fig. 8 is a side elevation thereof.

In Fig. 1 of the drawings we show a cut-off station at which slugs or sections of stock are cut from the leading end of a bar or wire 30 to provide blanks which can be used in carrying out our method. In Figs. 7 and 8 we show a blank 31 which has been cut from the stock 30 and which is of satisfactory size and shape for the production of castle nuts by cold working. Any suitable dies may be used for the cut-off operation such as the hollow die 32 through which the stock 30 is fed and a transverse movable die 33 for shearing the stock.

Figure 2:
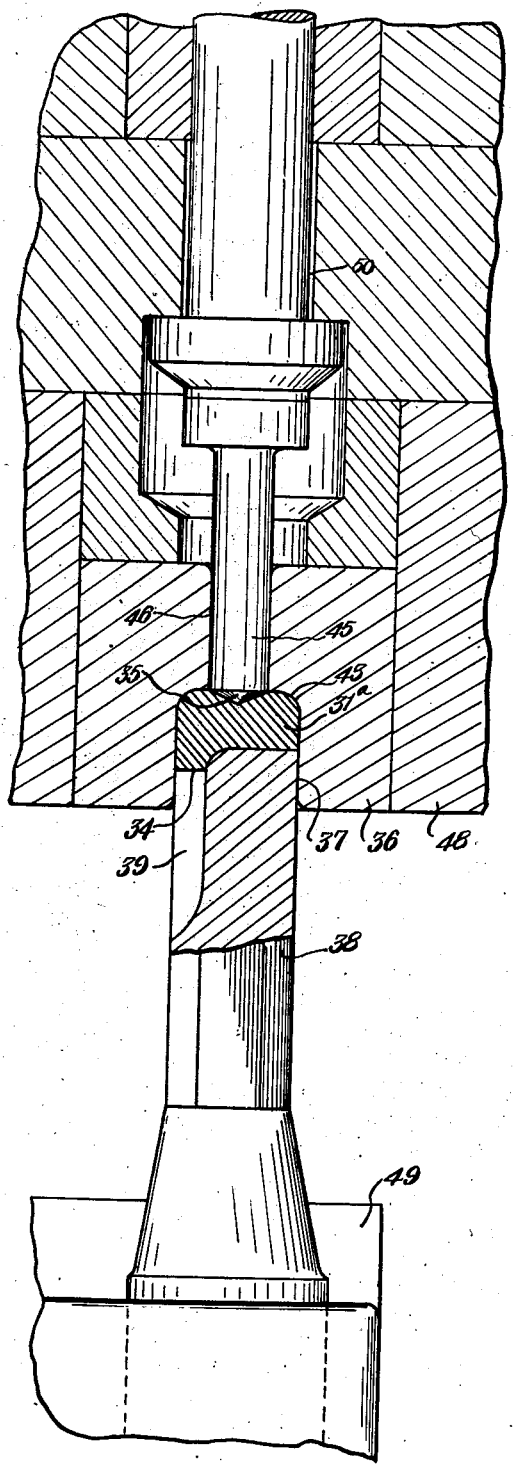
Fig. 2 is a sectional view taken through the pair of dies of the first forming operation and showing the punch extending into the recess of the die and engaging a blank therein.
Figure 5:
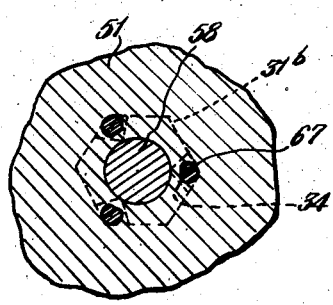
Fig. 5 is a partial transverse sectional view taken through the die of Fig. 3 as indicated by section line 5—5.

In Fig. 2 of the drawings we show the first forming operation or station to which the blanks 31 are fed in succession. At this station the blank 31 is upset and pressure shaped to a desired polygonal form such as the hexagon or substantially hexagon shaped blank 31a of Figs. 9 and 10. In this first forming operation partial castle prongs 34 are also formed on the outer end of the blank and a shallow central recess 35 may be formed in the inner end of the blank.

The dies with which the first forming operation is carried out may comprise a die 36 having a hexagon shaped recess or die cavity 37 therein and a punch 38 of corresponding hexagon cross-section. The punch is of a size and shape to enter the die recess 37 and to trap the metal of the blank therein when the latter is subjected to endwise pressure between the punch and the bottom of the die recess. The punch is provided with axial slots 39 into which metal of the blank is extruded or caused to flow by the pressure exerted on the blank to thereby form the partial castle prongs 34. The grooves 39 of the punch correspond in number with the number of castle prongs desired on the end of the blank. In this instance we show our method applied to the production of tri-castle nut blanks, that is, nut blanks having three prongs. In the nut blank herein shown the prongs are located at alternate corners of the hexagon and we, therefore, show the punch 38 as having the grooves 39 located at alternate corners thereof. It should be understood, however, that our invention can be applied to the production of other forms of castle nuts, such as those in which the prongs are located opposite the flats.

Figure 19:
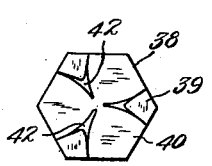
Fig. 19 is an end view of the punch with which the first forming operation is carried out.
Figure 21:
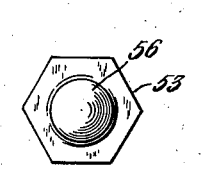
Fig. 21 is an end view of the punch used in the second forming operation.
Figure 16:
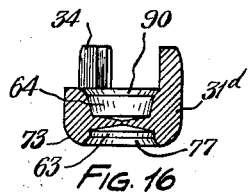
Fig. 16 is a sectional view taken through the blank at this stage as indicated by line 16—16 of Fig. 15.
Figure 20:
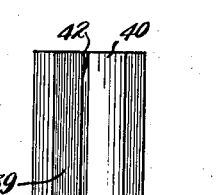
Fig. 20 is a side elevation thereof.
Figure 22:
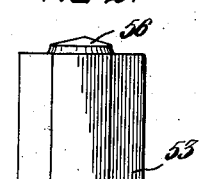
Fig. 22 is a side elevation thereof.
Figure 23:
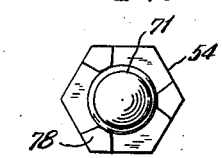
Fig. 23 is an end view of the punch used in the third forming operation.
Figure 25:
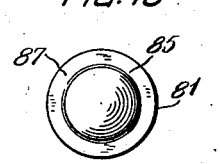
Fig. 25 is an end view of the punch used in the fourth forming operation.
Figure 27:
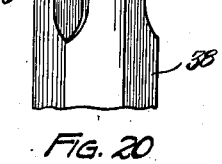
Fig. 27 is an end view of the piercing punch.
Figure 24:
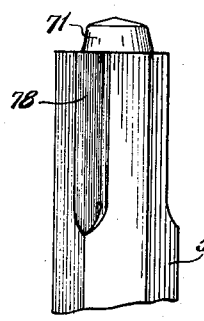
Fig. 24 is a side elevation of this punch.
Figure 26:
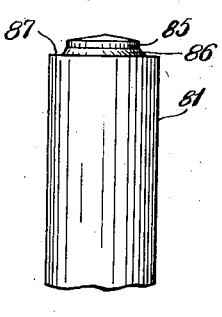
Fig. 26 is a side view of this punch.
Figure 28:
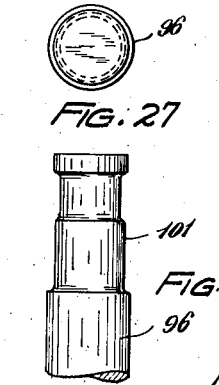
Fig. 28 is a side view thereof.

As shown in Figs. 19 and 20, the end face 40 of the punch 38 may be substantially flat or square except for the openings at which the grooves 39 intersect such end face. It may be desirable to form fillet-like portions 41 on the blank 31a which extend as substantially triangular solid webs from the partial prongs 34 inwardly toward the axis of the blank. If these fillet portions are desired on the blank, we provide the end face of the punch 38 with correspondingly shaped grooves 42 of varying or tapering depth and which intersect the grooves 39.

The bottom of the die recess 37 may be partially rounded, as indicated at 43, for forming an initial chamfer 44 on the inner end of the blank 31a. The bottom of the die recess may be formed in part by the beveled end of a knock-out pin 45 which extends part-way into the die recess through an opening 46 communicating therewith. The beveled end of this knock-out pin forms the recess 35 in the inner end of the blank during the forming operation. The formation of this recess is desirable because it receives and centers the tip of the punch of the next succeeding operation and tends to reduce lateral deflection and breakage of the punch and also facilitates the partial piercing which takes place during such succeeding operation.

Figure 9:
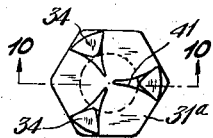
Fig. 9 is an end view of the blank after the first forming operation.
Figure 11:
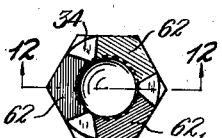
Fig. 11 is an end view of the blank after the second forming operation.
Figure 10:
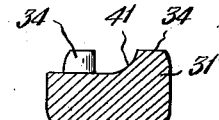
Fig. 10 is a transverse sectional view taken through the blank as indicated by line 10—10 of Fig. 9.
Figure 12:
Fig. 12 is a sectional view taken through the blank as indicated by line 12—12 of Fig. 11.

The die 36 may be mounted in an opening of a die holder or block 48 which may be suitably mounted on a portion of a nut forming machine or header substantially opposite a reciprocable slide or holder 49 which carries the punch 38. A knock-out follower 50 is arranged to engage the knock-out pin 45 and to cause the latter to eject the blank 31a from the die recess 37 after withdrawal of the punch 38 therefrom. The blank resulting from the first forming operation is shown in Figs. 9 and 10.

Figure 3:
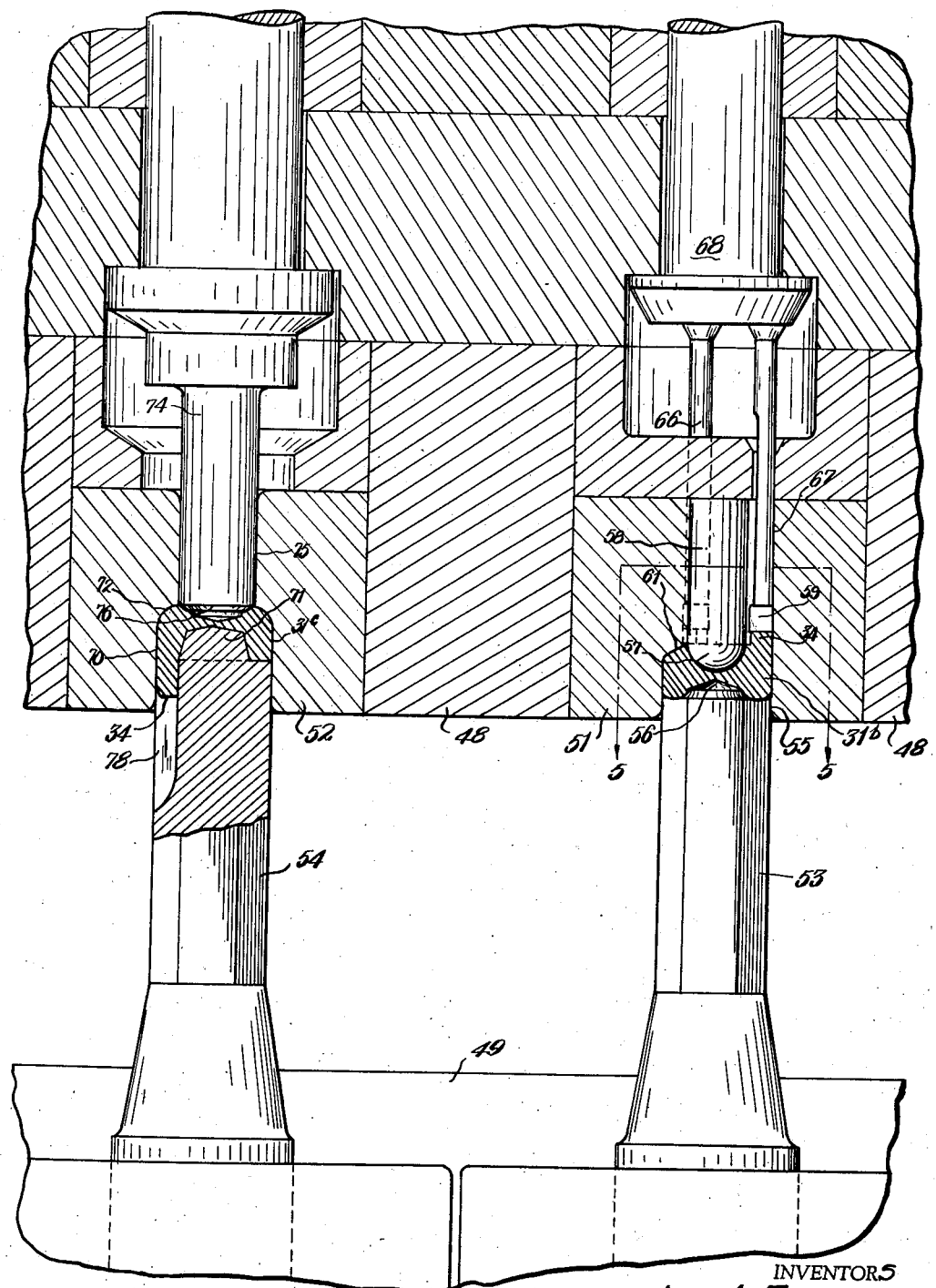
Fig. 3 is a similar sectional view showing the pairs of dies of the second and third forming operations.
Figure 4:
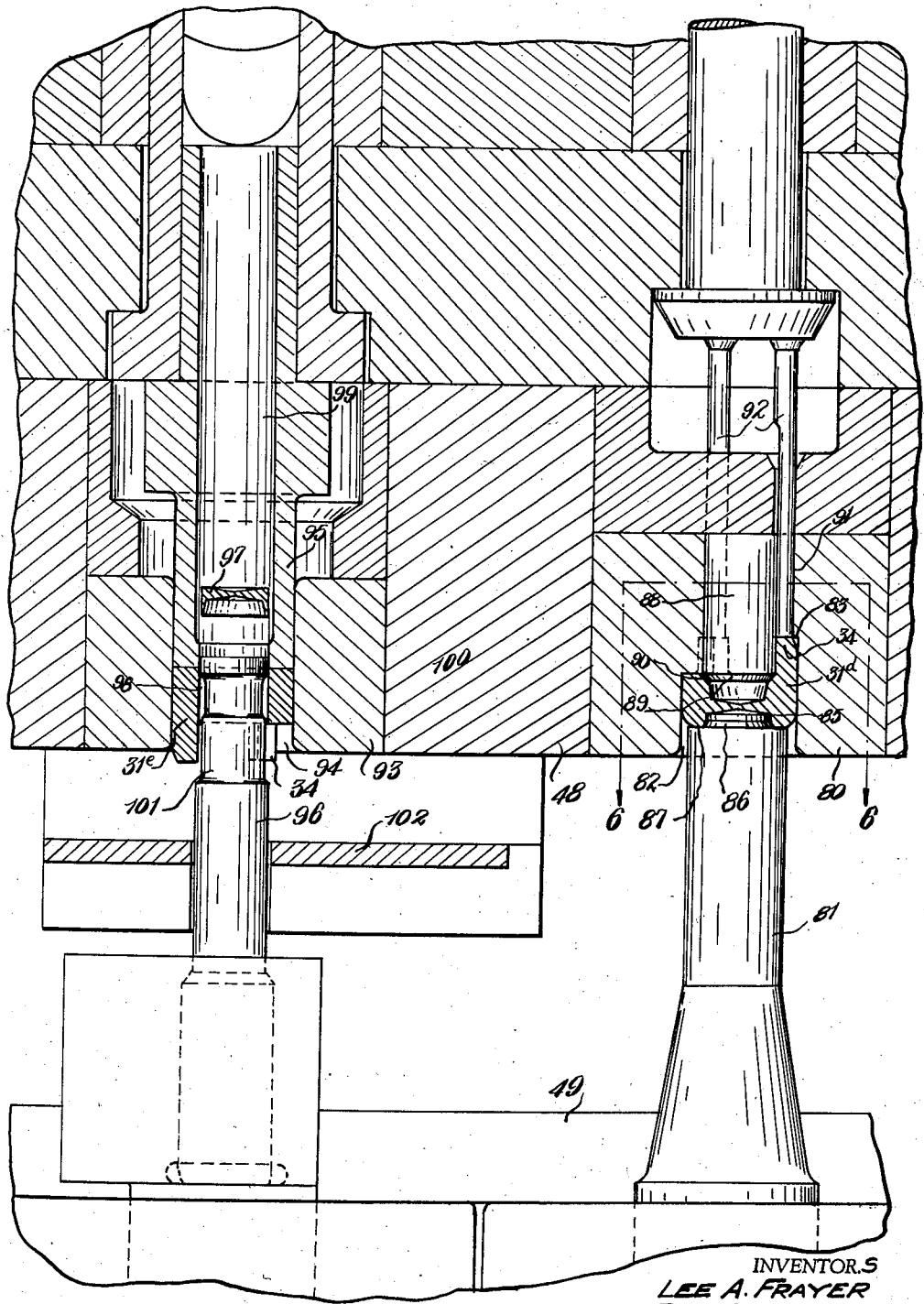
Fig. 4 is a similar sectional view showing the cooperating dies of the fourth forming operation and of the piercing operation.

In Fig. 3 we show dies 51 and 52 mounted in the block 48 and with which the punches 53 and 54 cooperate, respectively, for carrying out the second and third forming operations. The blanks 31a resulting from the first forming operation are transferred to the die 51 in which the second forming operation is carried out and the blanks 31b resulting from such second forming operation are transferred to the die 52 for the carrying out of the third forming operation. It is important to note that when the blank 31a is transferred from the die 36 to the die 51 for the second forming operation, it is reversed end for end so that the pronged end of the blank becomes the inner end and the end having the centering recess 35 becomes the outer end. Similarly, when the blank 31b is transferred from the die 51 to the die 52 for the third forming operation it is likewise reversed end for end so that the pronged end of the blank again becomes the outer end.

In the second forming operation the blank is subjected to a further pressure shaping by the hexagon punch 53 which enters the hexagon shaped recess 55 of the die and substantially traps the blank in the die recess. During this second operation the blank is also subjected to a partial axial piercing which displaces the metal from the center portion of the blank into the sides thereof. This partial piercing is accomplished by an extension tip 56 on the punch 53 and by the rounded end 57 of a punch or pin 58 which is mounted in the die 51 and extends into the recess or cavity 55 thereof. At the bottom of the die recess 55 we provide extension recesses 59 spaced around the pin 58 and located to receive the partial prongs 34 of the blank 31a and into which additional metal of the blank may be extruded or caused to flow during the partial piercing and pressure shaping operation for increasing the height of the prongs. The bevel or taper provided on the extension tip 56 of the punch facilitates the displacement or flow of metal into the sides of the blank during the partial piercing thereof.

It is important to note that the bottom of the die 51 has beveled portions 61 thereon between the openings into the extension recesses 59. The beveled portions 61 cause corresponding beveled portions 62 to be formed on the blank 31b during the pressure shaping operation. We find it very desirable to form the beveled portions 62 on the blank between each pair of prongs because, during the next succeeding operation, they have the effect of reducing or preventing the formation of flash and also facilitate the flow of metal into the prongs.

In carrying out this second forming operation the punch 53 applies endwise pressure to the blank 31b, and the projections 56 and 57 of the punch and die cause a partial piercing of the blank from opposite ends thereof. The punch extension 56 forms a correspondingly shaped recess 63 in the outer end of the blank and the rounded end 57 forms a correspondingly shaped recess 64 in the inner end of the blank. During this operation the blank is substantially trapped in the die recess 55 and the piercing of the blank from opposite ends causes metal to flow into the sides of the blank and into the extension recesses 59 to increase the height of the prongs 34. The further pressure forming to which the blank is subjected during this operation causes the corners thereof to be filled out to more regular polygonal shape.

For ejecting the blank 31b from the die 51 we apply knock-out thrust to the ends of the prongs 34 and for this purpose we provide knock-out pins 66 which operate in openings 67 of the die and are adapted to be projected into the extension recesses 59. Movement may be imparted to the pins 66 by the knock-out follower 68.

In the third forming operation, which is performed by the die 52 and the punch 54 and results in the blank 31c, additional metal is extruded or caused to flow into the prongs 34 to increase the height thereof. In this operation the blank is received in the hexagon shaped recess 70 of the die 52 and is subjected to pressure by the hexagon punch 54. The punch has an extension tip 71 which enters the recess 64 of the blank and, by reason of its tapered and beveled shape, causes additional metal to be displaced into the sides of the blank. The bottom of the die recess 70 is rounded as indicated at 72 so as to form a correspondingly shaped crown or chamfer 73 on the blank 31c. The bottom of the die recess may be formed in part by the outer end of a knock-out pin 74 which operates in the opening 75 of the die. The outer end of this knock-out pin may have a flat transverse face and an annular bevel 76 extending therearound. This outer end of the pin enters part-way into the previously formed recess 63 and the bevel 76 forms a corresponding annular bevel 77 on the blank.

Figure 13:
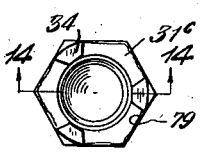
Fig. 13 is an end view of the blank after the third forming operation.
Figure 14:
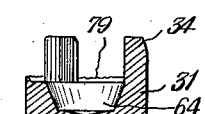
Fig. 14 is a sectional view of the blank taken on line 14—14 of Fig. 13.
Figure 15:
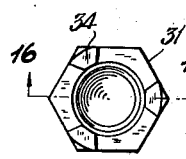
Fig. 15 is an end view of the blank after the fourth forming operation.

The punch 54 has axially extending slots 78 formed therein at points corresponding with the location of the prongs 34 and, during this operation, additional metal is extruded or caused to flow into the grooves 78 of the punch to thereby increase the height of the prongs 34. During this operation the beveled portions 62 of the blank 31b are flattened down by the end face of the punch 54 and it is important to note that when this occurs little or no flash is formed on the blank around the outer edge thereof. In Figs. 13 and 14 we show the blank 31c as having a small amount of flash 79 thereon around its outer edge. We find, however, that by forming the beveled sections 62 on the blank in the preceding operation this flash is minimized and in some instances substantially eliminated.

The blank which is ejected from the die 52 is transferred to the next station at which a fourth forming operation is performed thereon by the die 80 and the punch 81 and results in the blank 31d being produced. In transferring the blank 31c to the hexagonal recess 82 of the die 80 it is reversed end for end so that the prongs 34 again extend inwardly of the die. The die 80 has extension recesses 83 at the bottom thereof which receive the prongs 34 and into which some additional metal may be extruded or forced when pressure is exerted on the blank by the punch 81.

This fourth forming operation is mainly a finishing operation in which the blank is subjected to pressure shaping to improve the form thereof and to press down the flash 79 which may have been produced in the next previous forming operation. For carrying out this operation the punch 81 may be of circular form and the metal of the blank is preferably not trapped in the die. The punch 81 may have a tapered and beveled extension tip 85 thereon which enters the previously formed recess 63 of the blank and deepens this recess. The extension tip 85 may have an annular bevel 86 adjacent its base which reshapes or maintains the bevel 77 formed on the blank in the next preceding operation. Laterally outwardly of the extension tip 85 the punch 81 has a flat annular face or shoulder 87 which flattens and squares the chamfered outer end of the blank.

The die 80 may have an axial pin or stem 88 mounted therein and which projects part-way into the die recess 82. The tip or end of this stem projects into the die recess and may have a substantially flat end face and an annular bevel 89 thereon for forming a corresponding bevel 90 around this end of the tap opening of the blank 31d. The die 80 may also have openings 91 formed therein to connect with the extension recesses 83 and in which the knock-out pins 92 operate. In ejecting the blank 31d from the die 80 the pins 92 engage the ends or tops of the prongs 34 and exert knock-out thrust thereon.

Figure 17:
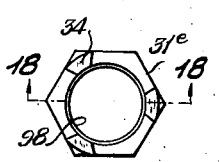
Fig. 17 is an end view showing the pierced blank ready for tapping.
Figure 18:
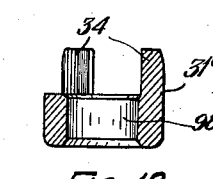
Fig. 18 is a sectional view thereof taken on line 18—18 of Fig. 17.

The blank which is ejected from the die 80 is next transferred to a die 93 for piercing, that is, punching out the tap opening which is to be subsequently threaded for the completion of the castle nut. The blank 31e resulting from the piercing operation is shown in Figs. 17 and 18 and is ready for tapping.

The piercing die 93 has a hexagon shaped recess 94 which receives the blank 31e and it will be noted that the blank is inserted in the die recess with its ends reversed with respect to the final or fourth forming operation, that is to say, the prongs 34 of the blank now extend outwardly of the die. The bottom of the die recess 94 is formed by a die sleeve 95 which supports the blank during the piercing operation. The piercing of the blank is performed by a piercing punch 96 which shears or displaces a slug of metal 97 from the center portion of the blank to thereby form the tap opening 98. This slug of metal is pushed into the central opening 99 of the die sleeve 95 and drops away from the die as scrap material.

During the piercing of the blank 31e there is a tendency for the prongs 34 to bend inwardly toward the axis of the blank. To prevent this distortion of the prongs we provide the piercing punch 96 with a shouldered portion 101 which enters the space inclosed by the prongs and prevents such inward bending thereof so that they remain straight and in properly spaced relation to each other.

The die sleeve 95 preferably also serves as a knock-out for ejecting the blank 31e from the die recess 94 after the piercing operation. In some instances the blank may stick to the punch when the latter is retracted from the die recess and a stripping operation may be necessary to remove the blank from the punch. For this purpose we may provide a stripper plate 102 which is located adjacent the outer end of the die 93 and has an opening through which the punch 96 extends.

It will be understood that in our improved method and apparatus the punches 38, 53, 54, 81 and 96 may all be carried by the same reciprocating holder or slide 49, and likewise the dies 36, 51, 52, 80 and 93 may constitute a series and may all be carried by the same die mount 48. Those skilled in this art will also understand that the cut-off station of Fig. 1 may be suitably located adjacent the first die 36 of the series and that the blanks may be transferred from the cut-off station and from one die of the series to another by any suitable transfer mechanism which will operate to reverse the blanks end for end between the forming operations as explained above. A transfer mechanism suitable for this purpose is disclosed in Patent No. 2,100,028, issued November 23, 1937.

From the foregoing description and accompanying drawings it will now be readily understood that we have provided a novel method and improved apparatus for forming pronged articles such as castle nuts, and with which these articles can be rapidly and economically produced. It will be seen furthermore that in carrying out our method the blank is subjected to pressure forming operations by which the blank is upset and shaped to the desired polygonal form and in which the blank is partially pierced and the metal is extruded or caused to flow to provide prongs at one end of the blank. It will also be seen that we provide for the application of knock-out thrust to the ends of the prongs for ejecting the blank from certain of the dies and also provide for holding the prongs against inward bending during the piercing operation.

While we have illustrated and described our method and apparatus in a somewhat detailed manner it will be understood, of course, that we do not wish to be limited to the particular method steps and arrangement of apparatus herein disclosed, but regard our invention as including such changes and modifications as do not constitute a departure from the spirit of the invention and the scope of the appended claims.

Having thus described our invention, we claim:

1. The method of making castle nuts, comprising upsetting a blank in a polygonal die and forming prongs on the outer end of the blank, transferring the blank to a second polygonal die with the ends of the blank reversed with respect to the first operation, and further shaping the blank in the second die and increasing the height of the prongs, and ejecting the blank from the die by knock-out thrust applied to the prongs.

2. The method of making castle nuts which comprises cutting sections from round stock thereby forming substantially cylindrical blanks with flat ends, upsetting such a blank in a polygonal die and in the same operation changing the blank from cylindrical to polygonal shape and forming prongs on one end of the blank, transferring the blank to a second polygonal die with the ends of the blank reversed with respect to the first operation, and further shaping the blank to polygonal form and increasing the height of the prongs.

3. The method of making castle nuts which comprises cutting sections from round stock thereby forming substantially cylindrical blanks with flat ends, upsetting such a blank successively in a series of polygonal dies, reversing the position of the blank in each of the different polygonal dies of the series after the first, and in the different upsetting operations gradually imparting a polygonal shape to the body of the nut and gradually forming prongs on one end thereof.

LEE A. FRAYER.
ROY S. SALTER.